United States Patent
Nagai (10) Patent No.: US 7,652,737 B2
(45) Date of Patent: Jan. 26, 2010

(54) LCD DEVICE HAVING AN IMPROVED VIEWING ANGLE CHARACTERISTIC

(75) Inventor: Hiroshi Nagai, Kanagawa (JP)

(73) Assignee: NEC LCD Technologies, Ltd. (JP)

(*) Notice: Subject to any disclaimer, the term of this patent is extended or adjusted under 35 U.S.C. 154(b) by 294 days.

(21) Appl. No.: 11/531,102

(22) Filed: Sep. 12, 2006

(65) Prior Publication Data

US 2007/0058120 A1    Mar. 15, 2007

(30) Foreign Application Priority Data

Sep. 14, 2005   (JP) ............................. 2005-266723

(51) Int. Cl.
  *G02F 1/1335*   (2006.01)
(52) U.S. Cl. .................. 349/119; 349/96; 349/117; 349/118
(58) Field of Classification Search ............ 349/96, 349/117–119
See application file for complete search history.

(56) References Cited

U.S. PATENT DOCUMENTS

2002/0024627 A1* 2/2002 Sakamoto et al. ........... 349/141
2005/0128411 A1* 6/2005 Nagai et al. ................. 349/141
2006/0181663 A1* 8/2006 Itakura et al. ............... 349/117

FOREIGN PATENT DOCUMENTS

JP     2001-242462     9/2001

* cited by examiner

*Primary Examiner*—Frank G Font
*Assistant Examiner*—Jerry Blevins
(74) *Attorney, Agent, or Firm*—Hayes Soloway P.C.

(57) ABSTRACT

A LCD device includes a pair of polarizing films sandwiching therebetween a LC cell. The light-incident-side polarizing film includes a polarizing layer and a first retardation film, whereas the light-emitting-side polarizing film includes a polarizing layer and second and third retardation films. A specific combination of the first and third retardation films provides an optical compensation for achieving a lower leakage light and a lower chromaticity shift upon display of a dark state in the LCD device.

8 Claims, 11 Drawing Sheets

LCD DEVICE HAVING AN IMPROVED VIEWING ANGLE CHARACTERISTIC

BACKGROUND OF THE INVENTION (a) Field of the Invention

The present invention relates to a liquid crystal display (LCD) device and, more particularly, to a LCD device including a homogeneously-oriented liquid crystal (LC) layer and having an improved viewing angle characteristic. The present invention also relates to a polarizing film pair for use in such a LCD device.

(b) Description of the Related Art

A lateral-electric-field-mode LCD device, such as an in-plane-switching-mode (IPS-mode) LCD device, is known in the art, wherein a pixel electrode and a common electrode generate therebetween a lateral electric field in the LC layer. The IPS-mode LCD device has the advantage of a wider viewing angle characteristic over the conventional TN-mode LCD device. The IPS-mode LCD device generally includes a LC cell, which includes first and second substrates and a LC layer sandwiched therebetween, and first and second polarizing films adhered onto the outer surface of the first and second substrates, respectively, of the LC cell.

The first and second substrates have a function of visualizing the change of orientation of LC molecules in the LC layer defined by the lateral electric field. The polarizing films are configured by layering a transparent protective film, such as a triacetyl cellulose (TAC) film, on a polarizing layer. The polarizing layer divides the incident light into two polarized light components perpendicular to one another, and passes therethrough one of the polarized-light components having an oscillation plane parallel to the transmission axis of the polarizing layer, while absorbing or scattering the other of the polarized-light components having an oscillation plane parallel to the absorption axis of the polarizing layer.

In the LCD device, the polarizing film pair and the initial orientation of the LC layer are generally designed such that the LCD device represents a dark state when both the electrodes generate therebetween no electric field whereas the LCD device represents a bright state when both the electrodes generate therebetween a specific electric field. In the bright state, the LC molecules in the LC layer are oriented at an angle of $\lambda/2$ deviated from the initial orientation of the LC molecules.

In general, a LCD device having a homogeneously-oriented LC layer, such as a transmission IPS-mode LCD device, includes a polarizing film pair sandwiching therebetween a LC cell as viewed in the thickness direction thereof. Both the polarizing films of the pair are disposed so that the transmission axes of both the polarizing films are perpendicular to one another. Such polarizing films are referred to as an orthogonal polarizer in the art. It is known that the orthogonal polarizer has an undesirable viewing angle dependency, wherein a light incident onto the orthogonal polarizer in a slanted direction with respect thereto changes the direction of the transmission axis of the polarizing film.

Thus, the orthogonal polarizer, which is disposed so that both the transmission axes of the polarizing layers are crossed at a right angle, allows the light incident onto the LC cell in a slanted direction and passed by the first polarizing film to have an undesirable light component parallel to the transmission axis of the second polarizing film due to deviation of the crossed angle from the right angle. The undesirable light component causes a leakage light passing through the second polarizing film upon display of a dark state in the LCD device.

The viewing angle dependency of the orthogonal polarizer as described above causes a reduction in the range of viewing angle, i.e., the visual range in which the luminance, contrast ratio and coloring of the image are well appreciated on the screen of the LCD device. In this view point, for achieving a wider range of viewing angle in the LCD device, it is essential to develop an optical-compensation polarizing film which is capable of reducing the viewing angle dependency of the orthogonal polarizer to prevent the leakage light and increase the range of viewing angle. Patent publication JP-2001-242462A, for example, describes a technique for use in a homogeneously-oriented IPS-mode LCD device, wherein a biaxial retardation film, acting as an optical compensating film, compensates the orthogonal polarizer so that the light component of the slanted-incident light parallel to the transmission axis of the second polarizing film is changed toward the perpendicular of the transmission axis, the slanted-incident light being incident onto the LC cell in a slanted viewing direction and passed by the first polarizing film.

In the LCD device described in the above publication, the mere addition of the optical compensating film having a wavelength dependency similarly to the LC layer cannot optically compensate the orthogonal polarizer in the entire wavelength range, although the compensation is effective in a specific wavelength range. This causes leakage light in the other wavelength ranges, and thus involves coloring of the image depending on the azimuth angle of the viewing direction. In addition, since the transparent protective layer of the polarizing film has a retardation depending on the thickness of the transparent protective film, the slanted-incident light, which is once turned by the light-incident-side polarizing layer to a linearly-polarized light, is turned again to an elliptically-polarized light by the transparent protective layer and additionally turned in the polarization by the LC layer, thereby increasing the undesirable leakage light and coloring of the emitted light.

SUMMARY OF THE INVENTION

In view of the above problems in the conventional techniques, it is an object of the present invention to provide a polarizing film pair and a LCD device which is capable of reducing a leakage light in a slanted viewing direction upon display of a dark state substantially without incurring a chromaticity shift.

The present invention provides a polarizing film pair including first and second polarizing films including first and second polarizing layers, respectively, said first polarizing film being associated with a first retardation film disposed between said first polarizing layer and said second polarizing film, said first retardation film having a birefringence characteristic, an in-plane retardation of 0 to 10 nm and a thickness-direction retardation of 0 to 35 nm, said second polarizing film being associated with second and third retardation films disposed between said second polarizing layer and said first polarizing film, said second retardation film having a birefringence characteristic, an in-plane retardation of 35 to 245 nm, a first refractive index (n1) along a first in-plane optical axis and a second refractive index (n2) along a second in-plane optical axis where n1<n2, said second optical axis being parallel or perpendicular to an absorption axis of said second polarizing layer, said third retardation film having a birefringence characteristic, an in-plane retardation of 0 to 15 nm, a thickness-direction retardation of 50 to 123 nm, a positive uniaxial optical characteristic, and an optical axis perpendicular to said second polarizing layer.

The present invention also provides a liquid crystal display (LCD) device including: a homogeneously-oriented liquid crystal (LC) layer; first and second substrates sandwiching therebetween the LC layer to form a LC cell; and first and second polarizing films sandwiching therebetween the LC cell and including first and second polarizing layers, respectively, the first polarizing film including a first retardation film on a surface of the first polarizing layer near the second polarizing film, said first polarizing film being associated with a first retardation film disposed between said first polarizing layer and said second polarizing film, said first retardation film having a birefringence characteristic, an in-plane retardation of 0 to 10 nm and a thickness-direction retardation of 0 to 35 nm, said second polarizing film being associated with second and third retardation films disposed between said second polarizing layer and said first polarizing film, said second retardation film having a birefringence characteristic, an in-plane retardation of 35 to 245 nm, a first refractive index (n1) along a first in-plane optical axis and a second refractive index (n2) along a second in-plane optical axis where n1<n2, said second optical axis being parallel or perpendicular to an absorption axis of said second polarizing layer, said third retardation film having a birefringence characteristic, an in-plane retardation of 0 to 15 nm, a thickness-direction retardation of 50 to 123 nm, a positive uniaxial optical characteristic, and an optical axis perpendicular to said second polarizing layer.

In accordance with the polarizing film pair and the LCD device of the present invention, the specific combination of the first through third retardation films provides a reduction in the leakage light in a slanted viewing direction upon display of a dark state substantially without incurring a chromaticity shift.

More specifically, in a preferred embodiment of the present invention, the first retardation film changes the polarized state of the light passed by the first polarizing layer, and the second and third retardation films change the polarized state of the light passed by the first retardation film and LC layer. This provides a lower scattering of the light passed by the second and third retardation films at the location of the first polarizing layer, thereby reducing the leakage light in the slanted viewing direction substantially without incurring a chromaticity shift.

Each of the first and second polarizing films may be disposed at the light-incident side or the light-emitting side of a LCD cell, so long as the other of the polarizing films 10 may be disposed opposite to the former with respect to the LCD cell.

The above and other objects, features and advantages of the present invention will be more apparent from the following description, referring to the accompanying drawings.

PREFERRED EMBODIMENT OF THE INVENTION

The principle of the present invention will be described before description of the preferred embodiment for a better understanding of the present invention. It is assumed here that the first polarizing film is disposed on the light-incident side of a LCD cell whereas the second polarizing film is disposed on the light-emitting side of the LCD cell, and that the second polarizing film has (or is associated with) the third and second retardation films in this order as viewed from the light-incident side toward the light-emitting side. In this case of the polarizing film pair or LCD device of the present invention, the first retardation film which may act as a protective layer for the first polarizing layer is disposed on the surface of the first polarizing layer near the LCD cell.

The first retardation film has a lower thickness-direction retardation, preferably smaller than 17 nm, in order to prevent the light incident onto the LC layer in the LCD cell in a slanted direction from being changed into an elliptically-polarized light. This suppresses the phase change of the light caused by the LC layer depending on the wavelength, allowing the incident light to pass through the LC layer in the state of substantially linearly-polarized light.

The third retardation film, which is disposed on the light-emitting side and has a positive uniaxial optical characteristic and an optical axis perpendicular to the first or polarizing layer, changes the substantially linearly-polarized light once into an elliptically-polarized light. The second retardation film, which has an in-plane retardation such as n1<n2, re-changes the elliptically-polarized light into a linearly-polarized light. The polarized axis of the linearly-polarized light passed by the LCD cell and the polarized axis of the linearly-polarized light passed by the second retardation film have different directions. By designing the thickness-direction retardations of the second and third retardation films within the range between 35 nm and 245 nm and the range between 50 nm and 123 nm, respectively, the viewing angle dependency of the polarizing film pair can be compensated.

If a single biaxial retardation film is used for the optical compensation toward a single direction, the wavelength dependency of the retardation of the single retardation film will appear as a chromaticity shift as it is. On the other hand, the combination of two positive uniaxial retardation films as used in the present invention effects the optical compensation in two directions, whereby the wavelength dependency can be cancelled at the light-emitting side to reduce the chromaticity shift.

Thus, combination of the three retardation films compensates the wavelength dependency of the retardation of the LC layer and polarizing layers, thereby reducing the leakage light in the slanted viewing direction upon display of a dark state substantially without incurring the chromaticity shift. If the first polarizing film and the second polarizing film are disposed on the light-emitting side and light-incident side, respectively, a similar result can be obtained.

Now, the present invention is more specifically described with reference to accompanying drawings, wherein similar constituent elements are designated by similar reference numerals throughout the drawings.

Figure 1:
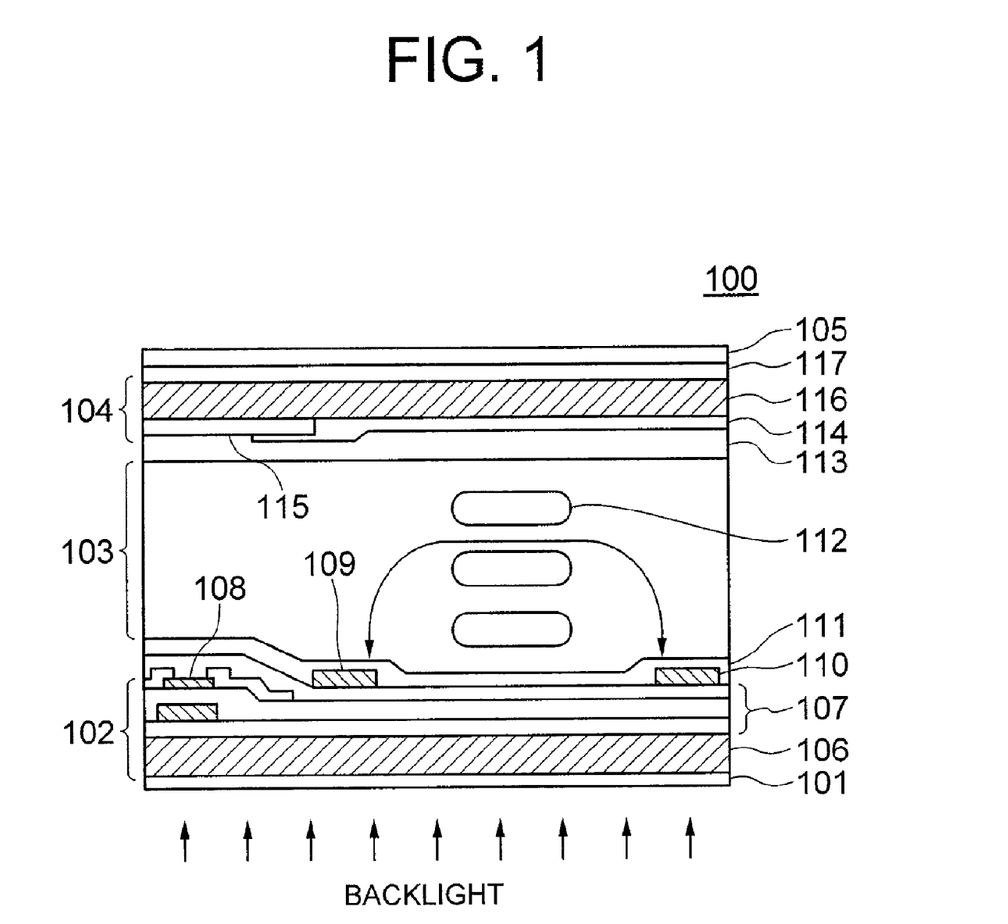
FIG. 1 is a sectional view of a pixel of a LCD device according to a first embodiment of the present invention.

FIG. 1 shows a pixel of an IPS-mode LCD device according to a first embodiment of the present invention. The LCD device, generally designated by numeral 100, includes light-incident-side polarizing film 101, TFT (thin-film-transistor) substrate 102, LC layer 103, CF (color-filter) substrate 104, and light-emitting-side polarizing film 105, which are consecutively disposed from the light-incident side toward the light-emitting side of the LCD device. A first orientation film 111 is formed on the surface of the TFT substrate 103 near the LC layer 103, whereas a second orientation film 113 is formed on the surface of the CF substrate 104 near the LC layer 103. The TFT substrate 102 includes a glass substrate body 106, on which insulating films 107, TFTs 108, pixel electrodes 107 and a common electrode 110 are formed.

The TFTs 108 control the potential applied to the pixel electrodes 109. In the LCD device 100, the pixel electrodes 109 and the common electrode 110 are formed on the TFT substrate 102, to apply a lateral electric field to the LC molecules 112 in the LC layer 103. The insulating films 107 may include silicon nitride. The CF substrate 104 includes a glass substrate body 116 on which color filters 114 and a light-shield film 115 are formed. The color filters 114 each provide a color among three primary colors including red, green and blue. The light-shield film 115 shields TFTs 108, data lines (not shown) etc. against light. The color filters 114 may be omitted if the LCD device is a monochrome LCD device.

Figure 2A:
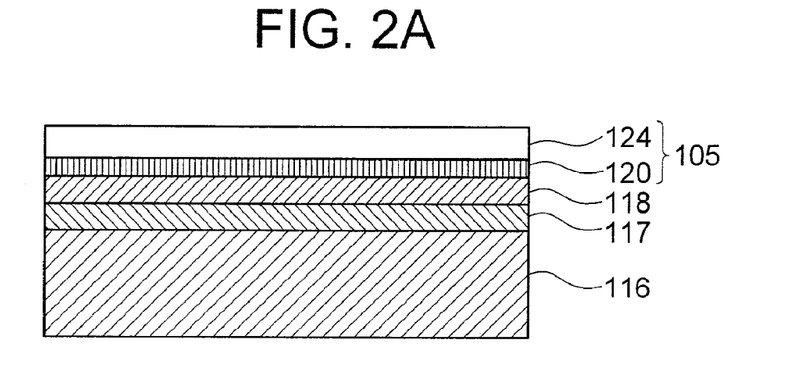
FIGS. 2A and 2B are detailed sectional views of the color-filter (CF) substrate and thin-film-transistor (TFT) substrate, respectively, in combination with the associated optical films.
Figure 2B:
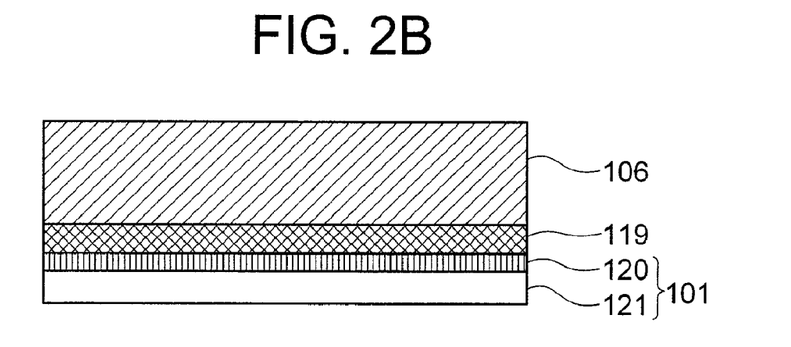

FIGS. 2A and 2B show the detail of the outer side of the glass substrate body of the CF substrate 104 and the TFT substrate 102, respectively. The glass substrate body 116 of the CF substrate 104 mounts thereon consecutively retardation film (nc) 117, retardation film (na) 118, and the polarizing film 105 including a polarizing layer 120 and a protective layer 124. The glass substrate body 106 of the TFT substrate 102 mounts thereon consecutively retardation film (ni) 119, and the polarizing film 101 including a polarizing layer 120 and a protective layer 121. The polarizing layers 120 are made of polyvinyl alcohol (PVA), whereas the protective layers 121 and 124 are made of TAC.

The retardation film (first retardation film: ni) 119, retardation film (second retardation film: na) 118, and retardation film (third retardation film: nc) 117 have respective specific optical characteristics. These retardation films 119, 118, 117 may be made of a film material adhered in this order as viewed from the light-incident side, or made of a coating material coating the glass substrate body.

A typical polarizing film is generally used while being sandwiched between a pair of protective (TAC) films. In the present embodiment however, retardation film (ni) 119 is disposed on the surface of the polarizing film 101 near the glass substrate body 106, and the polarizing layer 120 is sandwiched between the protective layer 121 and retardation film (ni) 119, whereby retardation film 119 has a function of a protective layer for the polarizing layer 120 of the first polarizing film 101. Similarly, retardation film (nc) 117 and retardation film (na) 118 are disposed on the surface of the polarizing film 105 near the glass substrate body 116, whereby retardation films 117 and 118 have a function of a protective layer for the polarizing layer 120 of the second polarizing film 105.

The protective layers 121, 124 each have a function of a negative uniaxial retardation film having an optical axis perpendicular to the surface of the polarizing films 101, 105. The protective layers 121, 124 have respective retardations depending on the thickness thereof; however, do not have an influence on the image due to provision on the outer surface of the polarizing layers 120. If retardation film 119 has a thickness-direction retardation of 0 nm, i.e., retardation of 0 nm in the thickness direction, retardation film 119 does not change the phase of the polarized light. Thus, a configuration wherein the first polarizing film 101 is directly adhered onto the glass substrate body 106 is equivalent to the configuration shown in FIG. 2B where retardation film 119 has a thickness-direction retardation of 0 nm.

The optical-compensation polarizing film pair used in the LCD device 100 and shown in FIGS. 2A and 2B are subjected to a simulation to obtain the conditions that the retardation films 117, 118, 119 should satisfy to achieve a desired result wherein the leakage light upon display of a dark state in the LCD device is reduced down to a level at which the observer of the LCD device scarcely notices the leakage light. Prior to this simulation, it is experimentally investigated as to which level of the backlight luminance scarcely affects the display quality of the IPS-mode LCD device in the slanted viewing direction, by changing the luminance of the backlight source from a maximum luminance toward a reduced luminance. This investigation revealed that half the ordinary maximum luminance level of the backlight source allows the leakage light in the slanted viewing direction to scarcely affect the display quality of the LCD device upon display of a dark state, and that a quarter of the ordinary maximum luminance allows the leakage light substantially not to affect the display quality.

In view of the above results of the investigation, the level at which the observer scarcely notices the leakage light is determined at half the reference leakage light which is equal to the leakage light observed from the orthogonal polarizer in the slanted viewing direction. In addition, the level of a chromaticity shift observed between the front view and the slanted viewing direction without causing degradation of chromaticity upon using the optical compensation is used as the reference chromaticity shift. The reference leakage light and reference chromaticity shift are used for determining a desired range of retardations of the retardation films. The slanted viewing direction used in this simulation is at an azimuth angle of 45 degrees away from the optical axis of the polarizing film pair and a polar angle of 45 degrees away from the plane of the substrate surface.

Figure 3:
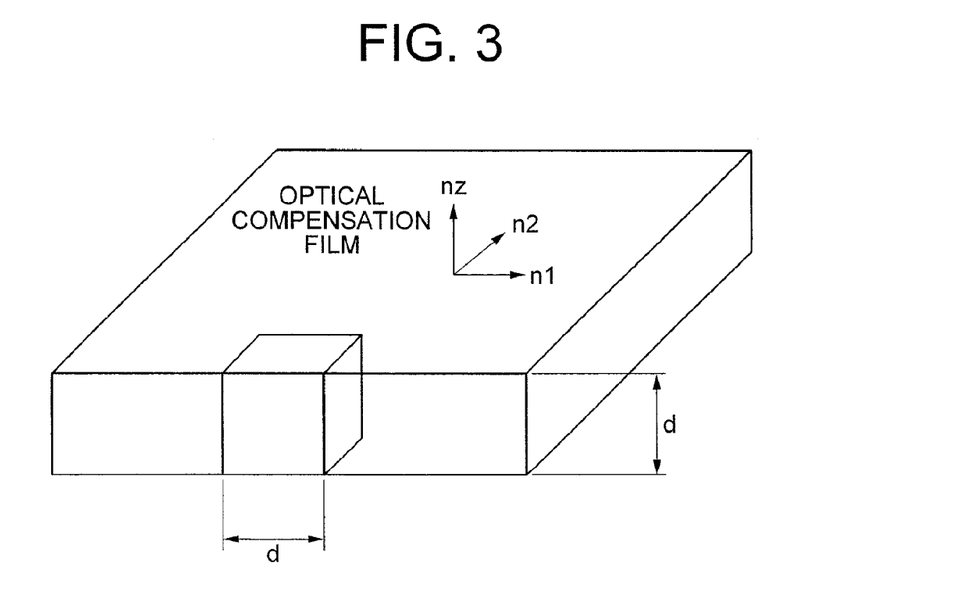
FIG. 3 is a perspective view showing definition of the retardations of the retardation film.

FIG. 3 shows the definition of the direction of the refractive index components of the retardation films 117, 118, 119, wherein n1 and n2 are the in-plane refractive index components and nz is the thickness-direction refractive index component of the retardation films. The in-plane retardation of the retardation films is defined by an absolute value of:

(n1−n2)×d where "d" is the thickness of the retardation films in terms of nanometers, for example.

The thickness-direction retardation is defined by an absolute value of:

[{(n1+n2)/2}−nz]×d.

In the above simulation, it was assumed that retardation film 117 had a uniaxial optical characteristic of (n1−n2)≈0, where n1<nz and n2<nz, retardation film 119 had a uniaxial optical characteristic of (n1−n2)≈0, where n1≧nz and n2≧nz, and retardation film 118 had an optical characteristic of n1<n2. The axial arrangement was such that the optical axis of retardation film 118 was perpendicular to the optical axis (slow axis: n2) of the polarization film 120, the optical axis of retardation films 117, 119 was perpendicular to the polarization layer 120, and the initial orientation of the LC layer 103 is aligned with the optical axis of retardation film 118. It is to be noted that whether the initial orientation of the LC layer is parallel or perpendicular to the optical axis of the polarizing film pair does not significantly affect the optical compensation effect because both the directions suppress the phase change of the LC layer.

Figure 4:
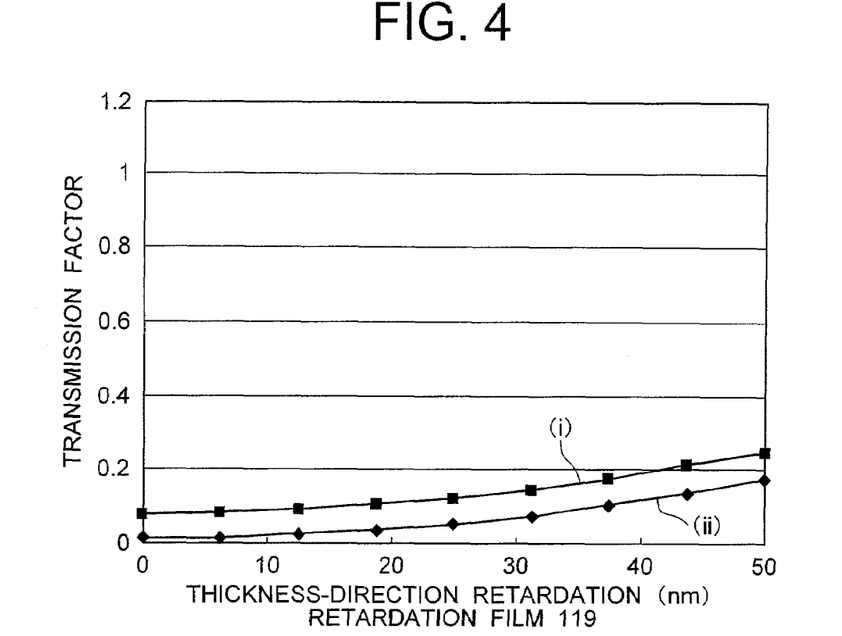
FIG. 4 is a graph showing the relationship between the thickness-direction retardation of a retardation film and the transmission factor normalized.

FIG. 4 shows the results of simulation obtained between the thickness-direction retardation of retardation film 119 and the normalized transmission factor during display of the dark state, wherein the transmission factor obtained for each retardation of retardation film 119 is normalized by the optical transmission factor in the case of employment of no optical compensation. The case of employment of no optical compensation is such that retardation films 117, 119 are each replaced by a 80- μm-thick TAC layer and retardation film 118 is not provided therein.

In FIG. 4, the transmission factor is calculated in the simulation for the thickness-direction retardation of retardation film 119 that is changed from 0 to 50 nm, wherein the graph (i) dotted by the square dots represents the case of associated retardation film 117 having a thickness-direction retardation of 50 nm, and the graph (ii) dotted by rhombus dots represents the case of associated retardation film having a thickness-direction retardation of 80 nm. The transmission factor is calculated for the case of the slanted viewing direction with respect to the orthogonal polarizer, as recited above.

As understood from FIG. 4, the normalized transmission factor calculated is below 0.5 for the entire range of employed thickness-direction retardation of retardation film 119, revealing the improved, wider viewing angle characteristic. The detail of FIG. 4 shows that retardation film 117 should have a thickness-direction retardation above 50 nm and retardation film 119 should have a thickness-direction retardation below 50 nm, for obtaining a higher optical compensation effect and achieving a lower transmission factor upon display of the dark state.

Figure 5:
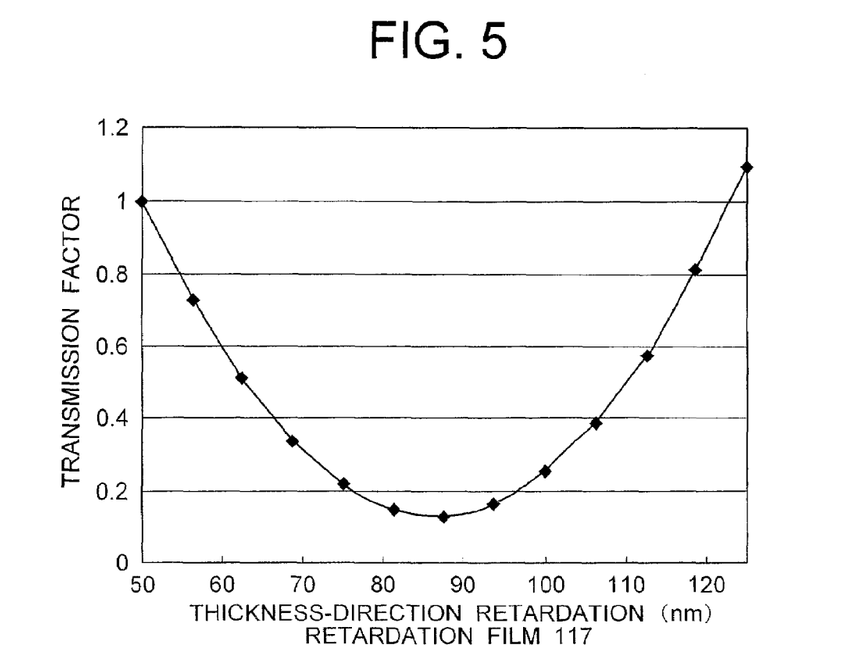
FIG. 5 is a graph showing the relationship between the thickness-direction retardation of a retardation film and the transmission factor normalized.

FIG. 5 shows the relationship obtained in the simulation between the thickness-direction retardation of retardation film 117 and the normalized transmission factor upon display of the dark state, similarly to FIG. 4 shown for retardation film 119. In this simulation, retardation film 118 had an in-plane retardation of 130 nm, and retardation film 119 had a thickness-direction retardation of 0 nm. As understood from FIG. 5, the normalized transmission factor is below 1 for the case of retardation film 118 having a thickness-direction retardation of 50 nm to 123 nm.

Figure 6:
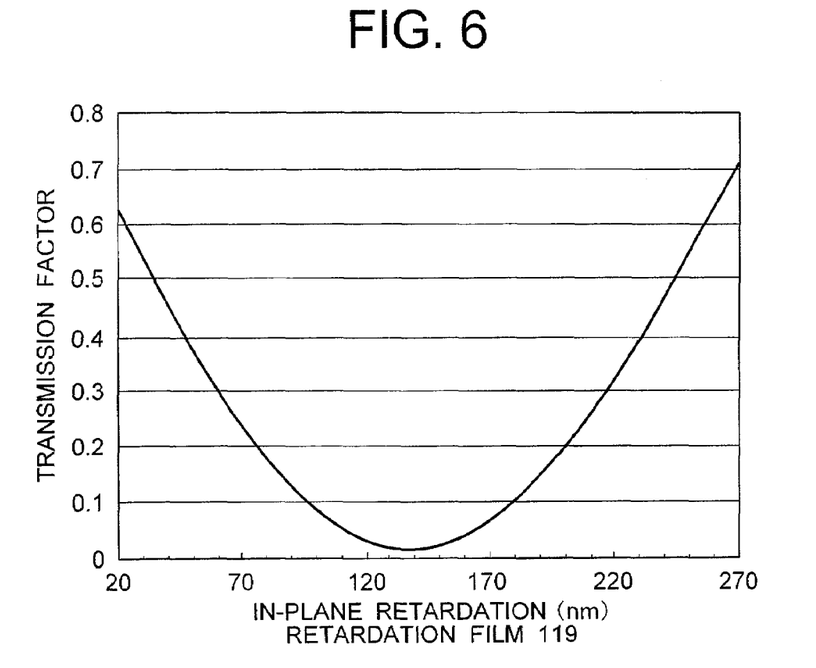
FIG. 6 is a graph showing the range of retardations achieving a reduction in the leakage light upon display of a dark state.

FIG. 6 shows the relationship obtained in the simulation between the in-plane retardation of retardation film 118 and the normalized transmission factor. In this simulation, the thickness-direction retardations of retardation film 117 and retardation film 119 are fixed at 80 nm and 0 nm, respectively.

As understood from FIG. 6, the normalized transmission factor is equal to or below 0.5 for the range of thickness-direction retardation of retardation film 118 between 35 nm and 245 nm. Thus, the leakage light in the slanted viewing direction at an azimuth angle of 45 degrees and a polar angle of 45 degrees upon display of the dark state is reduced down to the level at which the observer does not substantially notice the leakage light.

Figure 7:
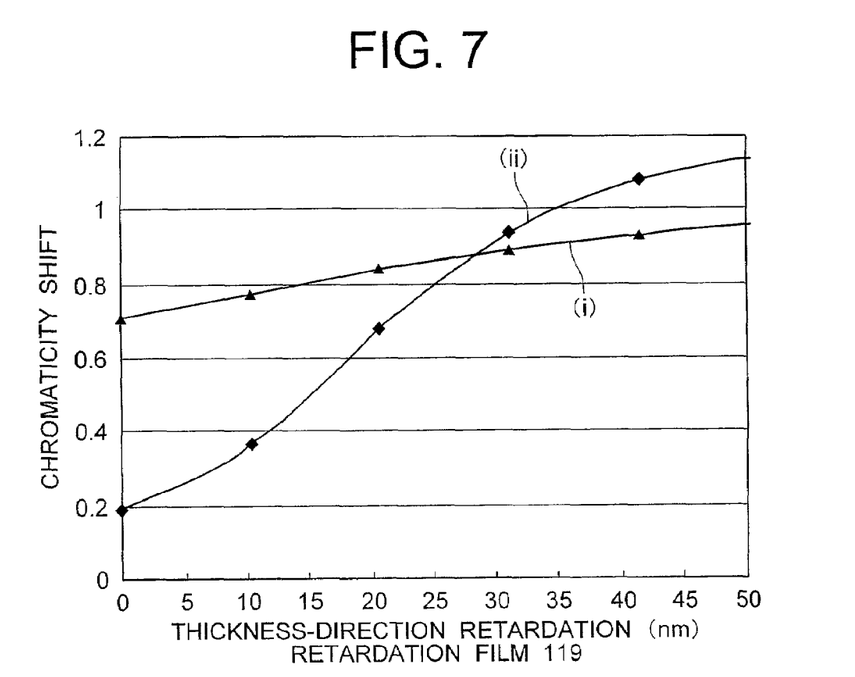
FIG. 7 is a graph showing the relationship between the thickness-direction retardation of the retardation films and the chromaticity shift normalized.

FIG. 7 shows the relationship obtained in a simulation between the thickness-direction retardation of retardation film 119 and the normalized chromaticity shift. In this simulation, the thickness-direction retardation of retardation film 119 is changed between 0 nm and 50 nm, with the in-plane retardation of retardation film 118 being fixed at 130 nm, for the case of retardation film 117 having a thickness-direction retardation of 50 nm (graph (i)) and 80 nm (graph (ii)), and the resultant chromaticity is measured in the front view and the slanted view to obtain the chromaticity shift.

As understood from FIG. 7, for the case of retardation film 117 having a thickness-direction retardation of 50 nm, the normalized chromaticity shift is below 1 in the entire range of thickness-direction retardation of retardation film 119 between 0 nm and 50 nm, thereby revealing no degradation of the chromaticity shift between the front view and the slanted view. On the other hand, for the case of retardation film 117 having a thickness-direction retardation of 80 nm, the normalized chromaticity shift can be maintained below 1 if the thickness-direction retardation of retardation film 119 is below 35 nm, and also maintained below 0.5 if the thickness-direction retardation of retardation film 119 is below 17 nm.

Figure 8:
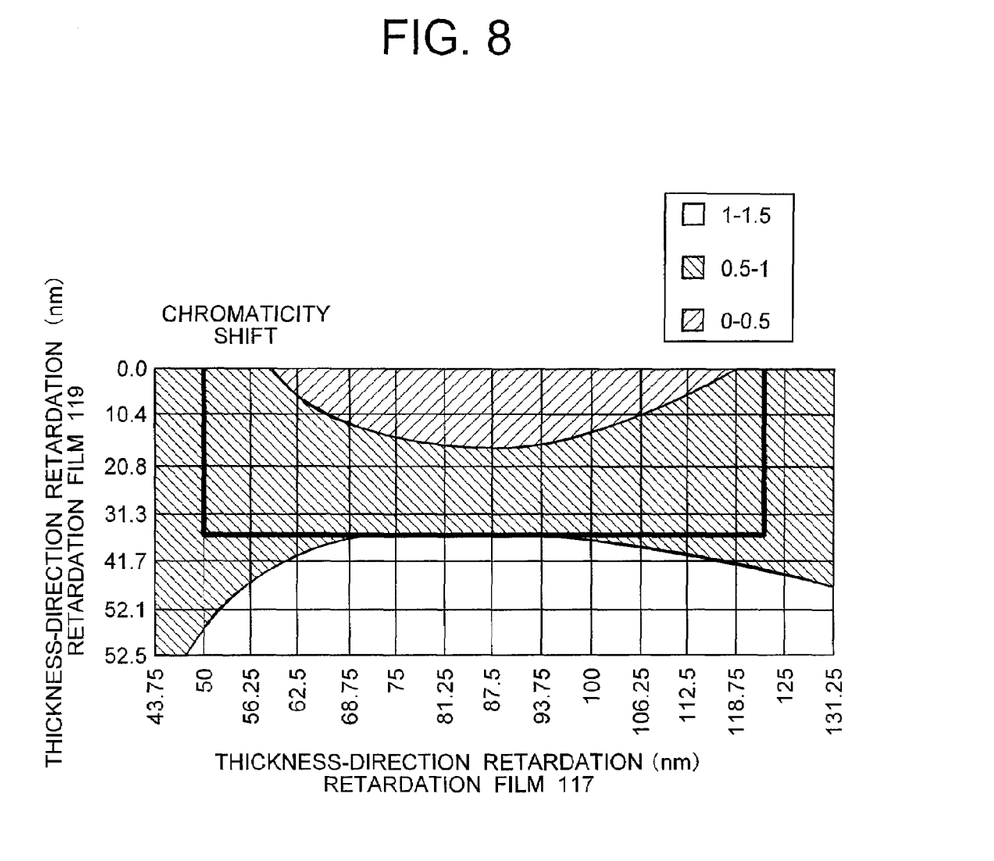
FIG. 8 is a graph showing the range of retardations achieving a normalized transmission factor of 0.5 or below and a normalized chromaticity shift of 1 or below.

FIG. 8 shows the relationship between the combination of thickness-direction retardations of retardation films 117, 119 and the normalized chromaticity shift. Since the chromaticity shift depends on the thickness-direction retardation of retardation film 117 as described above, another simulation was conducted for the range of thickness-direction retardation of retardation film 117 between 50 nm and 123 nm that is effective to reduce the luminance. In this simulation, the combination of the thickness-retardations of retardation films 117 and 119 which achieves a normalized chromaticity shift of 1 was obtained.

FIG. 8 shows the results of simulation. In the same drawing, the range of retardations which achieves a normalized transmission factor of 0.5 and a chromaticity shift of below 1 is selected and shown as encircled by a thick rectangular figure. This range is defined by the thickness-direction retardation of retardation film 119 between 0 nm and 35 nm and the thickness-direction retardation of retardation film 117 between 50 nm and 123 nm. In addition, another range of retardations which achieves a transmission factor of below 0.5 and a chromaticity shift of below 0.5 is also selected in FIG. 8 as a more preferable range. The another range is defined using the thickness-direction retardation ($nc1$) of retardation film 117 and thickness-direction retardation ($ni1$) of retardation film 119 by the following relationship:

$$57.0 - 0.23 \times ni1 + 0.11 \times ni1^2 \leq nc1 \leq 120.0 - 0.42 \times ni1 - 0.08 \times ni1^2,$$

where $ni1$ is in the range of 0 to 17 nm.

In the present embodiment, the combination of thickness-direction retardations of retardation films 117 and 119 is selected in the range defined by the thick rectangular figure, and in addition, the retardation of retardation film 118 is selected within the range that achieves a normalized transmission factor of 0.5 in FIG. 6. This provides a reduction in the leakage light upon display of a dark state down to a level at which the observer scarcely notices the leakage light, substantially without degrading the chromaticity shift between the front view and the slanted view. This result is considered due to the fact that the combination within the above range for the retardations of retardation films 11, 118, 119 allows retardation films 117, 118 to suppress scattering of light caused by the LC layer 103 and CF substrate 104, and as a consequence, a lower scattering condition is obtained at the location of the polarizing layer 120 configuring the second polarizing film 105 disposed at the light-emitting side of the LCD device.

In the present embodiment, retardation film (ni) 119 is used as the protective layer for the polarizing layer 120 disposed on the surface of the light-incident-side first polarizing film 101 near the LC layer 103, retardation film 119 having a smaller thickness-direction retardation, preferably equal to or below 17 nm, for suppressing the light incident onto the LC layer 103 in a slanted direction from being converted by the protective layer to an elliptically-polarized light. This suppresses phase change of the light depending on the wavelength, as encountered in the LC layer 103 of the conventional LCD device, thereby transmitting the light as an almost linearly-polarized light. On the other hand, in the light-emitting side of the LCD device, retardation film (nc) 117 having a positive uniaxial optical characteristic and an optical axis perpendicular to the surface of the polarizing layer 120 changes the linearly-polarized light passed by the LC layer 103 once into an elliptically-polarized light, and then retardation film 118 having an optical characteristic, wherein the in-plane refractive indexes n1 and n2 along the optical axes thereof have the relationship of n1<n2, re-changes the elliptically-polarized light from retardation film (nc) 117 again into a linearly-polarized light.

The direction of the polarized axis of the polarized light passed by the LC layer 103 is different from the direction of the polarized axis of the polarized light passed by retardation film 118. The in-plane retardation of retardation film (na) 118 designed in a range of 35 to 245 nm, and the thickness-direction retardation of retardation film 117 designed in a range of 50 to 123 nm cancel the viewing angle dependency of the orthogonal polarizer wherein the crossed angle deviates from the right angle for the slanted incident light. That is, the retardation films 117 and 118 thus designed change the polarized axis of the slanted incident light toward the absorption axis of the light-emitting-side second polarizing film 105.

If a single biaxial retardation film is used for optical compensation toward a single direction, i.e., for a linear compensation, the wavelength dependency of the birefringence of the single retardation film appears as a chromatic dispersion as it is. On the other hand, in the present embodiment, the combination of two positive uniaxial retardation films optically compensate the incident light toward two directions. This allows a shorter-wavelength light component having a higher wavelength-dependency to detour the optical path in a larger amount, to thereby cancel the wavelength dependency at the light-emitting side and reduce the chromatic dispersion.

Thus, the wavelength dependency of birefringence of the LC layer 103 and the optical compensation films including retardation films 117, 118 can be suppressed, thereby suppressing the leakage light in the slanted viewing direction upon display of a dark state and providing an optical compensation in a wider wavelength range without incurring a chromaticity shift. The present embodiment improves the viewing angle characteristic and thus the display quality of the LCD device.

In some LCD devices, a haze treatment is conducted on the surface of the polarizing film to improve the visibility of the image. In such LCD devices, if a larger leakage light is incurred in the slanted direction upon display of a dark state, the light emitted in the slanted direction may be emitted toward the front viewing direction due to the haze treatment of the polarizing film, thereby degrading the contrast ratio in the front view. In the present embodiment, the optical compensation using the retardation films 117, 118, 119 reduces the leakage light in the slanted direction upon display of a dark state, thereby suppressing the front leakage light caused by the surface treatment. Thus, the present embodiment reduces the front luminance upon display of the dark state, thereby improving the contrast ratio in the front view and providing a higher resolution image.

Figure 9A:
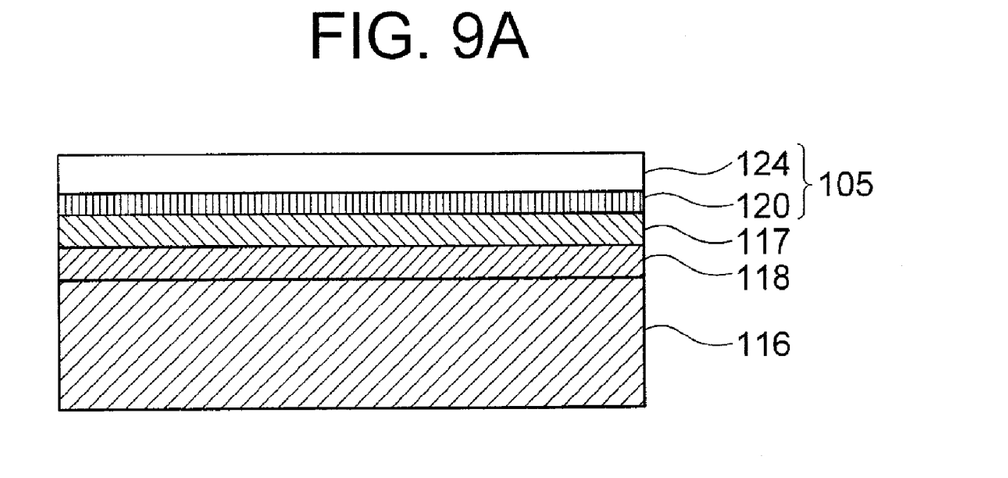
FIGS. 9A and 9B are detailed sectional views of the CF substrate and TFT substrate, respectively, in combination with the associated optical films, used in a second embodiment of the present invention.
Figure 9B:
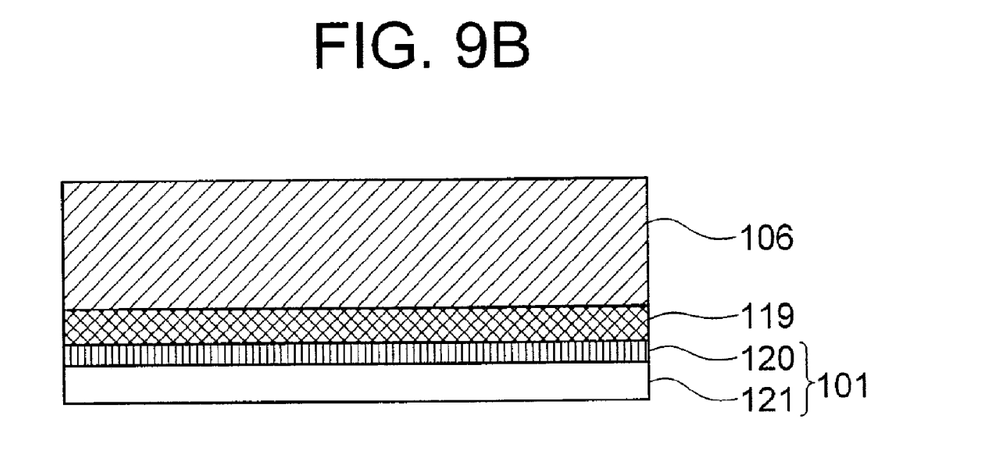

FIGS. 9A and 9B show, similarly to FIG. 2, the detail of the outer side of the glass substrate body of the CF substrate and the TFT substrate, respectively, in a LCD device according to a second embodiment of the present invention. The LCD device of the present embodiment is similar to the LCD device of the first embodiment shown in FIG. 1 except for the arrangement of the retardation films. More specifically, retardation films 118 and 117 are consecutively formed on the glass substrate body 116 in the present embodiment. Retardation film 117 has a function of protecting the polarizing layer 120 of the light-emitting-side second polarizing film 105.

A simulation was conducted for investigating the condition of the optical characteristic of the retardation films 117, 118, 119 to achieve a reduction in the leakage light upon display of a dark state down to a level at which the observer scarcely notices the leakage light. The conditions in the simulation were similar to those in the simulation conducted for the first embodiment. In the simulation of the present embodiment, retardation film 118 had an optical axis perpendicular to the optical axis of the polarizing layer 120.

The results of the simulation are similar to those shown in FIGS. 4 to 8. Thus, the order of the arrangement of retardation films 117 and 118 does not affect the results, retardation film 117 having a uniaxial optical characteristic wherein n1<nz and n2<nz, retardation film 118 having an optical characteristic of n1<n2. The combination of the retardations of retardation films 117, 118, 119 having the range as described before with respect to the first embodiment is also effective in the present embodiment.

Figure 10A:
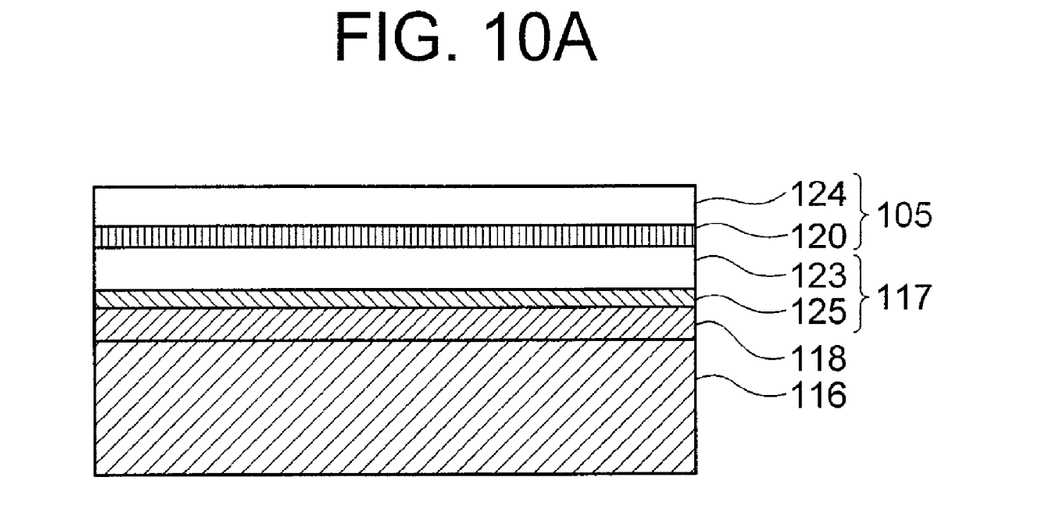
FIGS. 10A and 10B are detailed sectional views of the CF substrate and TFT substrate, respectively, in combination with the associated optical films, used in a third embodiment of the present invention.
Figure 10B:
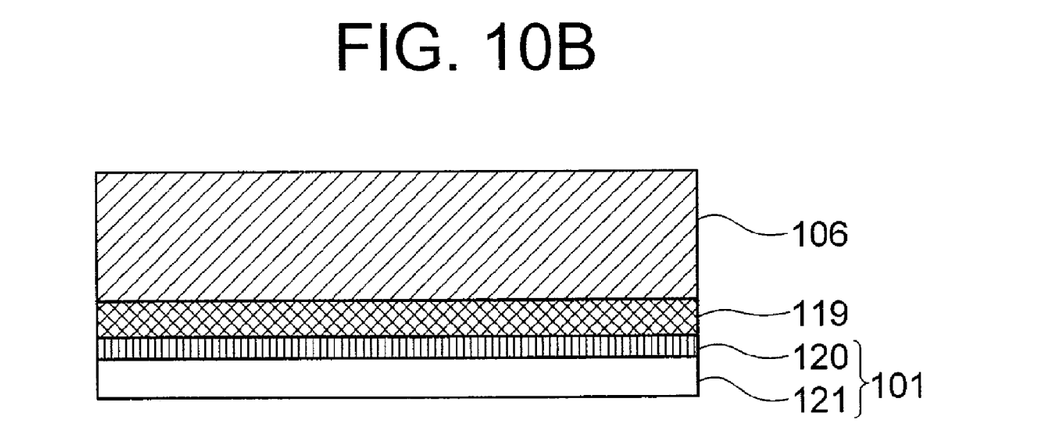

FIGS. 10A and 10B show, similarly to FIG. 2, the detail of the outer side of the glass substrate body of the CF substrate and the TFT substrate, respectively, in a LCD device according to a third embodiment of the present invention. The LCD device of the present embodiment is similar to the LCD device of the second embodiment except that two retardation films 123 and 125 in the present embodiment configure retardation film 117 in the second embodiment.

Retardation films 123, 125 each are configured by a uniaxial retardation film having an optical axis perpendicular to the polarizing surface of the polarizing film 105. One of retardation films 123, 125 is made of TAC generally used for configuring a protective layer, and the other of retardation films 123, 125 is made of a material which compensates an excess or deficiency of the retardation provided by the TAC film, whereby the combination of retardation films 123, 125 has an optical characteristic, such as a thickness-direction retardation, similar to that of retardation film 117.

In the above embodiments, the first polarizing film 101 and retardation film 119 are disposed on the light-incident side of the LCD device 100, whereas the second polarizing film 105 and retardation films 117, 118 are disposed on the light-emitting side. However, the first polarizing film 101 and retardation film 119 may be disposed on the light-emitting side, whereas the second polarizing film 105 and retardation films 117, 118 may be disposed on the light-incident side. In addition, the direction of the incident light may reversed from FIG. 1 and may be incident onto the second polarizing film 105, to achieve the advantages of the present invention. The retardation films 117, 118, 119 need not be attached onto the polarizing layer, and another film or glass substrate body may be disposed between the retardation films and the polarizing layer so long as the another film or glass substrate body does not change the polarized state of polarized light.

Figure 11A:
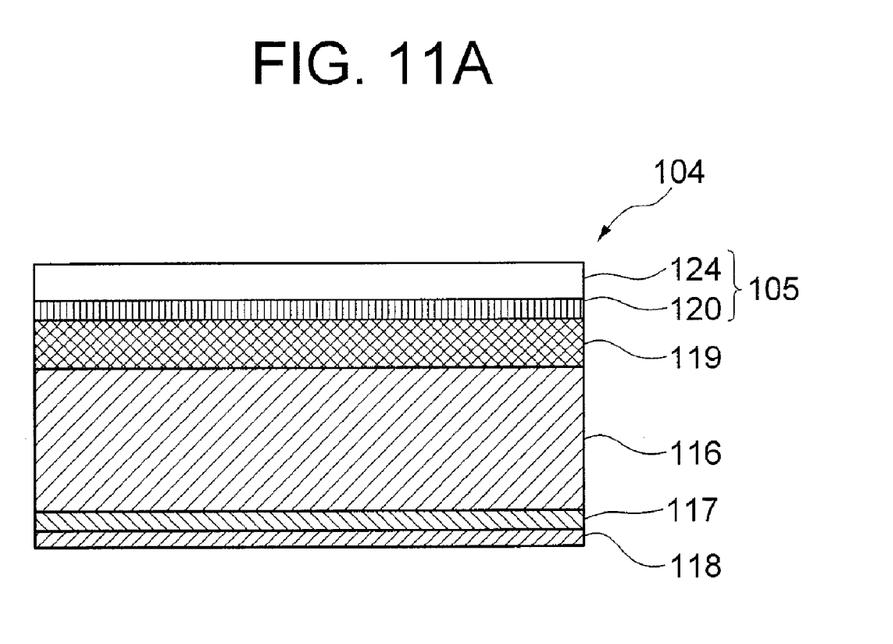
FIGS. 11A and 11B are detailed sectional view of a first modification of the CF substrate and TFT substrate, respectively, from FIGS. 2A and 2B.
Figure 11B:
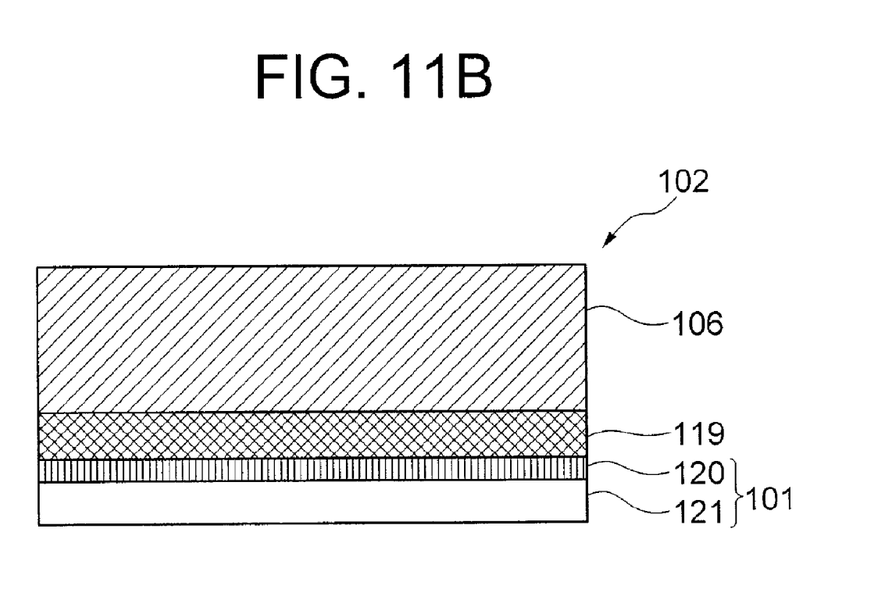

FIGS. 11A and 11B are sectional views of the CF substrate and TFT substrate, respectively, according to a first modification from those shown in FIGS. 2A and 2B. In the first modification, the TFT substrate 101 is similar to the TFT substrate 102 in the first embodiment, whereas the CF substrate 104 includes only a fourth retardation film (n1) 119 having a function of protective layer between the glass substrate body 116 and the second polarizing film 105. The second and third retardation films (na, nc) 118, 117 are disposed between the glass substrate body 116 of the CF substrate 104 and the first polarizing film 101.

Figure 12A:
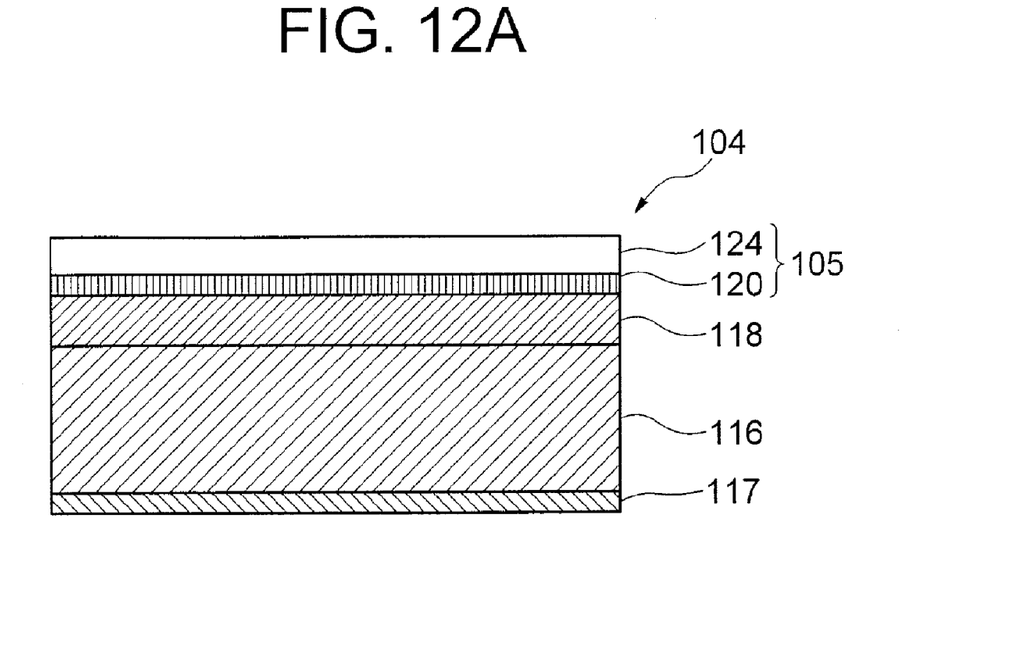
FIGS. 12A and 12B are detailed sectional view of a second modification of the CF substrate and TFT substrate, respectively, from FIGS. 2A and 2B.
Figure 12B:
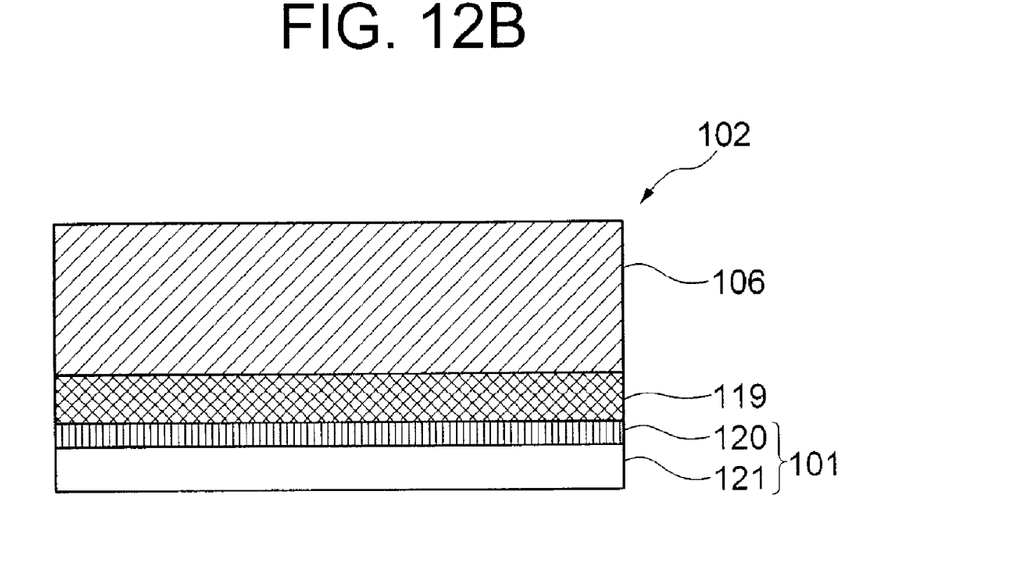

FIGS. 12A and 12B are sectional views of the CF substrate and TFT substrate, respectively, according to a second modification from those shown in FIGS. 2A and 2B. In the second modification, the TFT substrate 102 is similar to the TFT substrate 102 in the first embodiment, whereas the second polarizing film 105 includes the second retardation film (na) 118 between the polarizing layer 120 and the glass substrate body 116. The third retardation film (nc) 117 is disposed between the glass substrate body 116 of the CF substrate 104 and the first polarizing film 101.

Figure 13A:
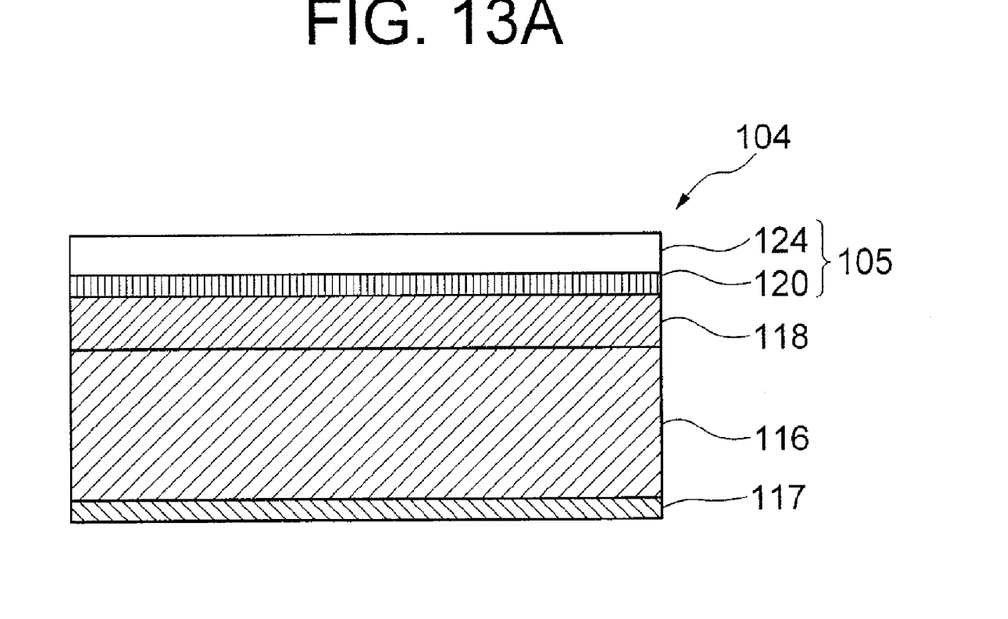
FIGS. 13A and 13B are detailed sectional view of a third modification of the CF substrate and TFT substrate, respectively, from FIGS. 2A and 2B.
Figure 13B:
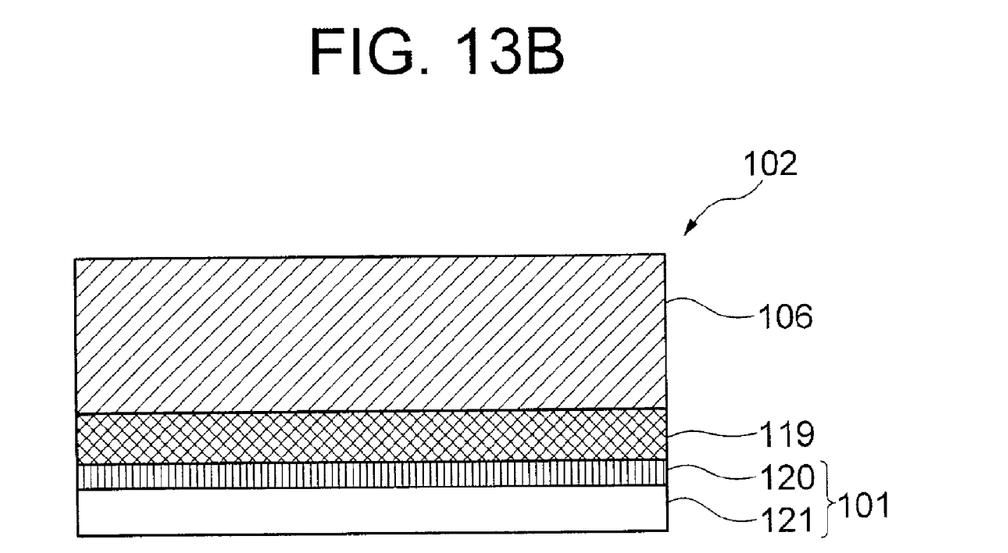

FIGS. 13A and 13B are sectional views of the CF substrate and TFT substrate, respectively, according to a third modification from those shown in FIGS. 2A and 2B. In the third modification, the TFT substrate 102 is similar to the TFT substrate 102 in the first embodiment, whereas CF substrate 104 includes only the second retardation film (na) 118 between the polarizing layer 120 and the glass substrate body 116. The third retardation film (nc) 117 is disposed between the glass substrate body 116 of the CF substrate 104 and the first polarizing film 101.

Figure 14A:
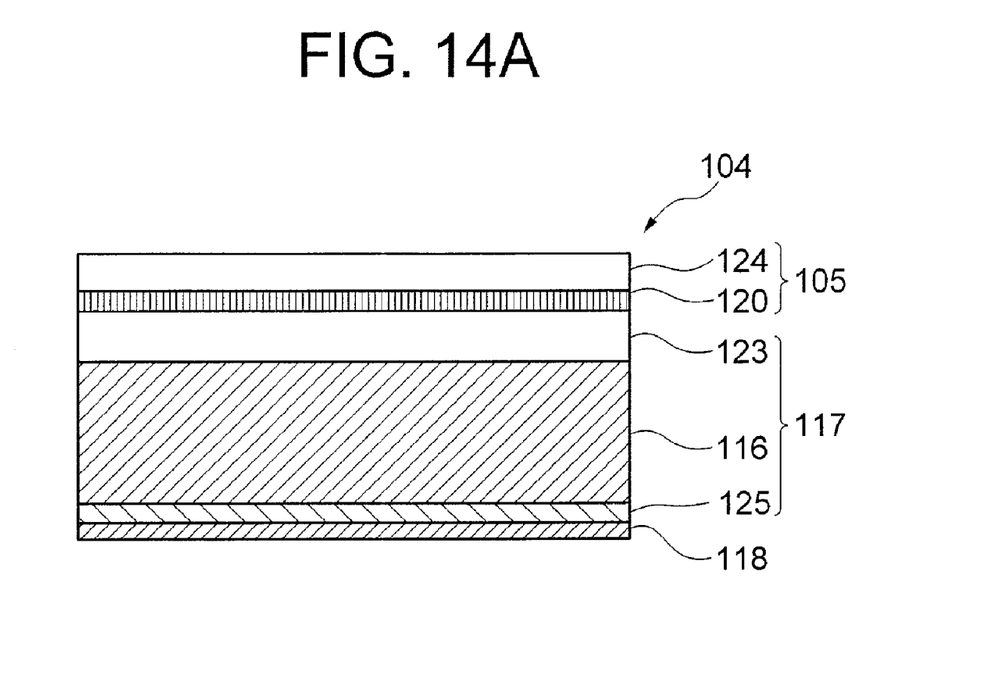
FIGS. 14A and 14B are detailed sectional view of a fourth modification of the CF substrate and TFT substrate, respectively, from FIGS. 2A and 2B.
Figure 14B:
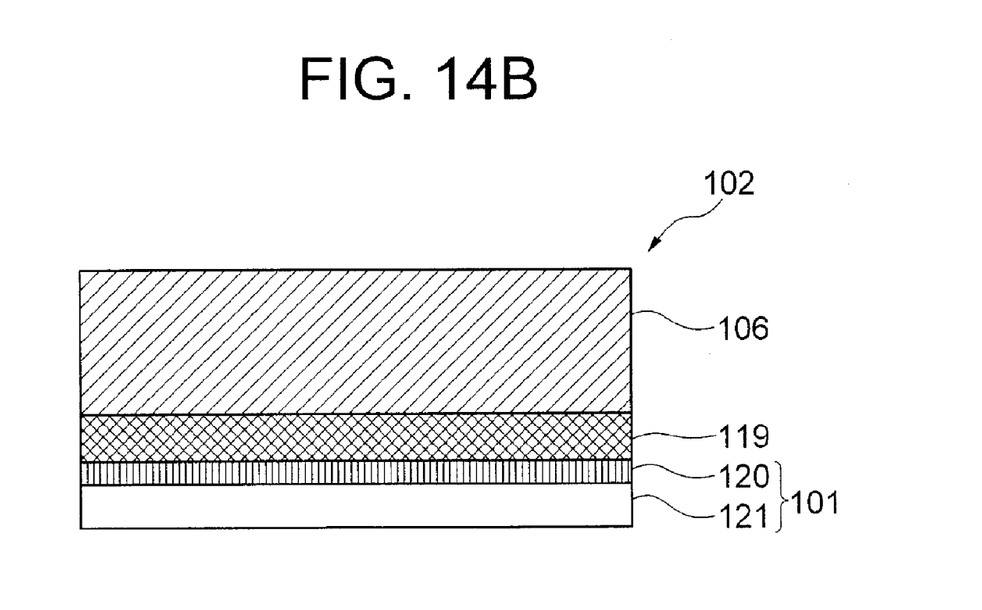

FIGS. 14A and 14B are sectional views of the CF substrate and TFT substrate, respectively, according to a third modification from those shown in FIGS. 2A and 2B. In the fourth modification, the TFT substrate is similar to the TFT substrate 102 in the first embodiment, whereas the CF substrate 104 includes a portion of the third retardation film (nc) 117 between the polarizing layer 120 and the glass substrate body 116 for protecting the polarizing layer 120. The second retardation film (na) 118 and another portion of the third retardation film (nc) 117 is disposed between the glass substrate body 116 of the CF substrate 104 and the first polarizing film 101.

Since the above embodiments are described only for examples, the present invention is not limited to the above embodiments and various modifications or alterations can be easily made therefrom by those skilled in the art without departing from the scope of the present invention.

What is claimed is:

1. A polarizing film pair comprising first and second polarizing films including first and second polarizing layers, respectively, said first polarizing film being associated with a first retardation film disposed between said first polarizing layer and said second polarizing film, said first retardation film having a birefringence characteristic, an in-plane retardation of 0 to 10 nm and a thickness-direction retardation of 0 to 35 nm, said second polarizing film being associated with second and third retardation films disposed between said second polarizing layer and said first polarizing film, said second retardation film having a birefringence characteristic, an in-plane retardation of 35 to 245 nm, a first refractive index (n1) along a first in-plane optical axis and a second refractive index (n2) along a second in-plane optical axis where n1<n2, said second in-plane optical axis being parallel or perpendicular to an absorption axis of said second polarizing layer, and said third retardation film having a birefringence characteristic, an in-plane retardation of 0 to 15nm, a thickness-direction retardation of 50 to 123 nm, a positive uniaxial optical characteristic, and an optical axis perpendicular to said second polarizing layer, wherein said first retardation film has an in-plane retardation of 0 to 7 nm and a thickness-direction retardation (ni1) of 0 to 17 nm, said third retardation film has an in-plane retardation of 0 to 10 nm and a thickness-direction retardation (nc1), and the following relationship holds:

$$57.0-0.23 \times ni1+0.11 \times ni1^2 \leq nc1 \leq 120.0-0.42 \times ni1-0.08 \times ni1^2.$$

2. The polarizing film pair according to claim 1, wherein said first polarizing film has a first protective layer, said first retardation film and said first protective layer sandwiching therebetween said first polarizing layer, and said second polarizing film has a second protective layer, said second and third retardation films and said second protective layer sandwiching therebetween said second polarizing layer.

3. The polarizing film pair according to claim 1, wherein said second retardation film is disposed nearer to said first polarizing film than said third retardation film.

4. The polarizing film pair according to claim 1, wherein said second retardation film is disposed further from said first polarizing film than said third retardation film.

5. A polarizing film pair comprising first and second polarizing films including first and second polarizing layers, respectively, said first polarizing film being associated with a first retardation film disposed between said first polarizing layer and said second polarizing film, said first retardation film having a birefringence characteristic, an in-plane retardation of 0 to 10 nm and a thickness-direction retardation of 0 to 35 nm, said second polarizing film being associated with second and third retardation films disposed between said second polarizing layer and said first polarizing film, said second retardation film having a birefringence characteristic, an in-plane retardation of 35 to 245 nm, a first refractive index (n1) along a first in-plane optical axis and a second refractive index (n2) along a second in-plane optical axis where n1<n2 said second in-plane optical axis being parallel or perpendicular to an absorption axis of said second polarizing layer, and said third retardation film having a birefringence characteristic, an in-plane retardation of 0 to 15 nm, a thickness-direction retardation of 50 to 123 nm, a positive uniaxial optical characteristic, and an optical axis perpendicular to said second polarizing layer, wherein said first retardation film has a thickness-direction retardation (ni1) of approximately less than 17 nm, said third retardation film has a thickness-direction retardation (nc1), and the following relationship holds:

$$57.0-0.23 \times ni1+0.11 \times ni1^2 \leq nc1 \leq 120.0-0.42 \times ni1-0.08 \times ni1^2.$$

6. The polarizing film pair according to claim 5, wherein said first polarizing film has a first protective layer, said first retardation film and said first protective layer sandwiching therebetween said first polarizing layer, and said second polarizing film has a second protective layer, said second and third retardation films and said second protective layer sandwiching therebetween said second polarizing layer 7. The polarizing film pair according to claim 5, wherein said second retardation film is disposed nearer to said first polarizing film than said third retardation film.

8. The polarizing film pair according to claim 5, wherein said second retardation film is disposed further from said first polarizing film than said third retardation film.

* * * * *

UNITED STATES PATENT AND TRADEMARK OFFICE
CERTIFICATE OF CORRECTION

| | |
|---|---|
| PATENT NO. | : 7,652,737 B2 |
| APPLICATION NO. | : 11/531102 |
| DATED | : January 26, 2010 |
| INVENTOR(S) | : Hiroshi Nagai |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 430 days.

Signed and Sealed this

Twenty-third Day of November, 2010

David J. Kappos
*Director of the United States Patent and Trademark Office*